(12) United States Patent
Barrus

(10) Patent No.: US 9,716,858 B2
(45) Date of Patent: *Jul. 25, 2017

(54) AUTOMATED SELECTION AND SWITCHING OF DISPLAYED INFORMATION

(75) Inventor: John Barrus, Menlo Park, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/041,805

(22) Filed: Mar. 7, 2011

(65) Prior Publication Data

US 2012/0229589 A1    Sep. 13, 2012

(51) Int. Cl.
*H04N 7/14* (2006.01)

(52) U.S. Cl.
CPC .................. *H04N 7/147* (2013.01)

(58) Field of Classification Search
USPC ............................................ 348/14.01–14.08
See application file for complete search history.

(56) References Cited

U.S. PATENT DOCUMENTS

| 5,025,314 | A | * | 6/1991 | Tang ..................... G06F 3/0425 178/18.11 |
| 5,400,069 | A | * | 3/1995 | Braun .................... H04N 7/144 348/14.08 |
| 5,502,576 | A | | 3/1996 | Ramsay et al. |
| 5,570,301 | A | | 10/1996 | Barrus |
| 5,767,897 | A | * | 6/1998 | Howell ..................... 348/14.07 |
| 5,790,114 | A | | 8/1998 | Geaghan et al. |
| 5,844,569 | A | | 12/1998 | Eisler et al. |
| 6,070,247 | A | | 5/2000 | Wallace et al. |
| 6,392,694 | B1 | * | 5/2002 | Bianchi .................. H04N 7/181 348/169 |
| 6,707,444 | B1 | | 3/2004 | Hendriks et al. |
| 6,772,335 | B2 | | 8/2004 | Curtis et al. |
| 6,917,033 | B2 | | 7/2005 | Hendriks et al. |
| 6,963,334 | B1 | | 11/2005 | Stevens et al. |
| 6,985,620 | B2 | | 1/2006 | Sawhney et al. |
| 7,170,526 | B1 | | 1/2007 | Johnson |
| 7,219,233 | B1 | | 5/2007 | Hendriks et al. |
| 7,242,389 | B1 | | 7/2007 | Stern |
| 7,355,584 | B2 | | 4/2008 | Hendriks et al. |
| 7,554,576 | B2 | | 6/2009 | Erol et al. |
| 7,634,540 | B2 | | 12/2009 | Ivashin et al. |
| 7,791,597 | B2 | | 9/2010 | Silverstein et al. |

(Continued)

FOREIGN PATENT DOCUMENTS

| CN | 1473292 A | 2/2004 |
| CN | 1617129 A | 5/2005 |

(Continued)

OTHER PUBLICATIONS

Non-Final Office Action for U.S. Appl. No. 13/041,769 mailed Aug. 31, 2012, 23 pages.

(Continued)

*Primary Examiner* — Maria El-Zoobi
(74) *Attorney, Agent, or Firm* — Kilpatrick Townsend & Stockton LLP

(57) ABSTRACT

Techniques for automatically selecting information to be displayed. The displayed information may be automatically and dynamically changed in response to changes in one or more preconfigured conditions.

24 Claims, 8 Drawing Sheets

(56) References Cited

U.S. PATENT DOCUMENTS

| | | |
|---|---|---|
| 8,125,510 B2 | 2/2012 | Agarwal et al. |
| 8,180,567 B2 | 5/2012 | Geelen et al. |
| 8,195,952 B2 | 6/2012 | Andreev et al. |
| 8,234,578 B2 | 7/2012 | Ferren et al. |
| 8,352,180 B2 | 1/2013 | Geelen et al. |
| 8,355,038 B2 | 1/2013 | Robinson et al. |
| 8,390,718 B2 | 3/2013 | Robinson et al. |
| 8,698,873 B2 | 4/2014 | Barrus |
| 8,881,231 B2 | 11/2014 | Barrus |
| 2001/0051876 A1 | 12/2001 | Seigel et al. |
| 2002/0135536 A1 | 9/2002 | Bruning |
| 2002/0196327 A1 | 12/2002 | Rui et al. |
| 2003/0058227 A1* | 3/2003 | Hara et al. .............. 345/178 |
| 2003/0065722 A1 | 4/2003 | Leperen |
| 2003/0070072 A1 | 4/2003 | Nassiri |
| 2003/0078840 A1* | 4/2003 | Strunk et al. .............. 705/14 |
| 2003/0138135 A1 | 7/2003 | Chung et al. |
| 2003/0236792 A1 | 12/2003 | Mangerie et al. |
| 2004/0070616 A1 | 4/2004 | Hildebrandt et al. |
| 2004/0199639 A1 | 10/2004 | Harris |
| 2005/0093948 A1 | 5/2005 | Morris et al. |
| 2005/0104864 A1 | 5/2005 | Zhang et al. |
| 2006/0053230 A1 | 3/2006 | Montero |
| 2006/0092178 A1 | 5/2006 | Tanguay, Jr. et al. |
| 2006/0285689 A1 | 12/2006 | Selve |
| 2007/0216660 A1* | 9/2007 | Sposato et al. ............. 345/173 |
| 2007/0245407 A1 | 10/2007 | Lester et al. |
| 2008/0043100 A1 | 2/2008 | Sobel |
| 2008/0089586 A1 | 4/2008 | Igarashi et al. |
| 2008/0316348 A1 | 12/2008 | Hallock |
| 2009/0002346 A1 | 1/2009 | Henning et al. |
| 2009/0019360 A1 | 1/2009 | Lynggaard et al. |
| 2009/0021495 A1 | 1/2009 | Edgecomb et al. |
| 2009/0063492 A1* | 3/2009 | Meyyappan et al. ............. 707/9 |
| 2009/0073129 A1 | 3/2009 | Sirotich et al. |
| 2009/0116703 A1 | 5/2009 | Schultz |
| 2009/0146973 A1 | 6/2009 | Ung et al. |
| 2009/0160818 A1 | 6/2009 | Wilde et al. |
| 2009/0173856 A1 | 7/2009 | Auger et al. |
| 2009/0173867 A1 | 7/2009 | Auger et al. |
| 2009/0183228 A1 | 7/2009 | Dasch et al. |
| 2009/0244278 A1* | 10/2009 | Taneja .................. G06Q 10/10 348/143 |
| 2009/0271848 A1 | 10/2009 | Leung et al. |
| 2009/0309956 A1* | 12/2009 | Hawkins et al. .......... 348/14.08 |
| 2009/0315861 A1* | 12/2009 | Zhang et al. ................ 345/179 |
| 2010/0037273 A1 | 2/2010 | Dressel et al. |
| 2010/0039296 A1 | 2/2010 | Marggraff et al. |
| 2010/0049626 A1 | 2/2010 | Hong et al. |
| 2010/0073330 A1 | 3/2010 | Ericson et al. |
| 2010/0149349 A1 | 6/2010 | Kroeker et al. |
| 2010/0153160 A1 | 6/2010 | Bezemer et al. |
| 2010/0177054 A1 | 7/2010 | Iida et al. |
| 2010/0178645 A1 | 7/2010 | Ieperen et al. |
| 2010/0182285 A1 | 7/2010 | Tremblay |
| 2010/0188478 A1* | 7/2010 | Robinson ................ H04N 7/15 348/14.16 |
| 2010/0194708 A1 | 8/2010 | Popovich |
| 2010/0231556 A1 | 9/2010 | Mines et al. |
| 2010/0281287 A1 | 11/2010 | Doerksen et al. |
| 2010/0289776 A1 | 11/2010 | Bryborn Krus et al. |
| 2010/0293601 A1 | 11/2010 | Schultz et al. |
| 2010/0293605 A1 | 11/2010 | Longobardi |
| 2010/0315413 A1 | 12/2010 | Izadi et al. |
| 2010/0315994 A1 | 12/2010 | Lam |
| 2011/0013001 A1 | 1/2011 | Craven-Bartle et al. |
| 2011/0084893 A1* | 4/2011 | Lee et al. ........................ 345/6 |
| 2011/0109554 A1* | 5/2011 | Boissier ....................... 345/166 |
| 2011/0181520 A1 | 7/2011 | Boda et al. |
| 2011/0234746 A1* | 9/2011 | Saleh ..................... G06F 3/041 348/14.03 |
| 2011/0254914 A1* | 10/2011 | Ng ............................ 348/14.16 |
| 2011/0320961 A1 | 12/2011 | Sriraghavan et al. |
| 2012/0030756 A1 | 2/2012 | Todd |
| 2012/0110007 A1 | 5/2012 | Cohen et al. |
| 2012/0117514 A1 | 5/2012 | Kim et al. |
| 2012/0218304 A1* | 8/2012 | Anzures et al. ............. 345/649 |
| 2012/0229425 A1 | 9/2012 | Barrus et al. |
| 2012/0229590 A1 | 9/2012 | Barrus |
| 2012/0233553 A1 | 9/2012 | Barrus |
| 2012/0233615 A1 | 9/2012 | Barrus |
| 2012/0274584 A1 | 11/2012 | Schweikart |
| 2012/0278388 A1 | 11/2012 | Kleinbart et al. |
| 2012/0280948 A1 | 11/2012 | Barrus et al. |
| 2012/0281092 A1 | 11/2012 | Olivier et al. |

FOREIGN PATENT DOCUMENTS

| | | |
|---|---|---|
| CN | 101436136 A | 3/2009 |
| CN | 101657826 A | 2/2010 |
| CN | 101819511 A | 9/2010 |
| EP | 1 613 084 A2 | 1/2006 |
| JP | H06-243076 A | 9/1994 |
| JP | H06-276335 A | 9/1994 |
| JP | 2000-043486 A | 2/2000 |
| JP | 2007-158601 A | 6/2007 |
| JP | 2008-257660 A | 10/2008 |
| JP | 2009-151508 A | 7/2009 |
| JP | 2012-507052 A | 3/2012 |
| WO | WO 94/07327 A1 | 3/1994 |
| WO | WO 01/10121 A1 | 2/2001 |
| WO | WO 2006/071637 A2 | 7/2006 |
| WO | WO 2010/053803 A1 | 5/2010 |
| WO | 2010/100157 A1 | 9/2010 |

OTHER PUBLICATIONS

U.S. Appl. No. 13/041,769, filed Mar. 7, 2011, by John Barrus.
U.S. Appl. No. 13/041,792, filed Mar. 7, 2011, by John Barrus.
U.S. Appl. No. 13/041,838, filed Mar. 7, 2011, by John Barrus.
U.S. Appl. No. 13/041,910, filed Mar. 7, 2011, by John Barrus et al.
U.S. Appl. No. 13/102,963, filed May 6, 2011, by John Barrus et al.
"Hitachi to Bundle EverNote Software and Technologies With StarBoard Products", Ritescript Press Releases, Nov. 7, 2007, Evernote Corp., 2 pages.
Baker at el., "Computation and Performance Issues in Coliseum, an Immersive Videoconferencing System", Jul. 15, 2003, Mobile and Media Systems Laboratory, HP Laboratories, Palo Alto, USA, 18 pages.
Bezaitis, "New Technologies for Aging in Place", Aging Well, vol. 1 No. 2 p. 26, Spring 2008, Great Valley Publishing Co., Inc., Spring City, USA, 4 pages.
Cisco WebEx Meeting Center—Product Overview: Share ideas with anyone, anywhere—online, Copyright 2011, Cisco Systems, Inc., 2 pages.
Citrix Online, Product Overvire|Web Conferencing, Collaboration Tools, Copyright 2011, Citrix Online, 4 pages.
CopyCam Installation and Operation Guide, Copyright 2009, Steelcase Corporation, 72 pages.
Dibbell, "Gestural Interfaces", Technology Review, May/Jun. 2011, MIT, 1 page.
Hitachi Digital Media, "Ultimate Short Throw LCD Projectors for Business and Education, Preliminary Specifications", Sep. 2010, downloaded from internet http://www.hitachiultimateprojector.com/docs/Ultimate_Short_Throw_Brochure_UK_prelim.pdf, 4 pages.
How Aviary Uses Evernote for WhiteBoard Sessions, Aviary.com, downloaded from internet http://www.youtube.com/watch?v=tmtHJ71JPrc on Apr. 2, 2012, 6 pages.
Ishii et al., "ClearBoard: A Seamless Medium for Shared Drawing and Conversation with Eye Contact", CHI '92, May 3-7, 1992, Association for Computing Machinery, 10 pages.
Ishii et al., "Iterative Design of Seamless Collaboration Media", vol. 37 No. 8, Aug. 1994, Communications of the ACM, Association for Computing Machinery, pp. 84-97, 15 pages.
Kunz et al., "ColloBoard: A Novel Interactive Electronic Whiteboard for Remote Collaboration with People on Content", 2010 International Conference on Cyberworlds, Copyright 2010 IEEE Computer Society, 8 pages.

(56) References Cited

OTHER PUBLICATIONS

Larkin, "Editorial Review of *BumpTop*", PCWorld.com, downloaded from internet http://www.pcworld.com/downloads/file/fid,77603/description.html on Sep. 15, 2011, 1 page.
Liao et al., "Robust and Accurate Visual Echo Cancelation in a Full-duplex Projector-camera System", Sep. 9, 2006, 17 pages.
LifeSize Desktop—Superior Standalone HD Desktop Client, Copyright 2010, LifeSize Communications, 2 pages.
Microsoft® Office Live Meeting Feature Guide, Jan. 2005, Microsoft Corporation, 17 pages.
MimioCapture Ink Recording System, Copyright 2011 DYMO Mimio, downloaded from internet http://www.mimio.dymo.com/en-US/Products/MimioCapture.aspx on Sep. 15, 2011, 1 page.
MimioClassroom Solution, Copyright 2011 DYMO Mimio, downloaded from internet http://www.mimio.dymo.com/en-US/Products/MimioClassroom-Family-of-Products.aspx on Sep. 15, 2011, 2 pages.
MimioPad Wireless Tablet, Copyright 2011 DYMO Mimio, downloaded from internet http://www.mimio.dymo.com/en-US/Products/MimioPad-Wireless-Tablet.aspx on Sep. 15, 2011, 1 page.
MimioStudio 9 Software, Jan. 2012 Specifications Sheet, DYMO, 2 pages.
MimioStudio Interactive Software, Copyright 2011 DYMO Mimio, downloaded from internet http://www.mimio.dymo.com/en-US/Products/MimioStudio-Software.aspx on Sep. 15, 2011, 1 page.
MimioTeach Interactive System, Copyright 2011 DYMO Mimio, downloaded from internet http://www.mimio.dymo.com/en-US/Products/MimioTeach-Interactive-System.aspx on Sep. 15, 2011, 2 pages.
MimioTeach, Jan. 2012 Specifications Sheet, DYMO, 2 pages.
MimioView Document Camera, Copyright 2011 DYMO Mimio, downloaded from internet http://www.mimio.dymo.com/en-US/Products/MimioView-Document-Camera.aspx on Sep. 15, 2011, 1 page.
Mohan et al., "Bokode: Imperceptible Visual tags for Camera Based Interaction from a Distance", Camera Culture Group, MIT Media Lab, downloaded from internet http://cameraculture.media.mit.edu/bokode on Sep. 15, 2011, 12 pages.
Raskar et al., "The Office of the Future: A Unified Approach to Image-Based Modeling and Spatially Immersive Displays", Jul. 19-24, 1998, SIGGRAPH 98, Orlando, Florida, Computer Graphics Proceedings, Annual Conference Series, 10 pages.
Screen sharing, Skype, downloaded from internet http://www.skype.com/intl/en-us/features/allfeatures/screen-sharing/ on Jan. 18, 2012, 4 pages.
Scriblink, Copyright 2012 Scriblink LLC., downloaded from internet http://www.scriblink.com/index.jsp?act=about on Feb. 7, 2012, 1 page.
SMART Bridgit™ conferencing software, Copyright 2011, SMART Technologies, 2 pages.
SMART Notebook™ 10.8—Mac OS X operating system software User's guide, Copyright 2008-2011, SMART Technologies ULC., 134 pages.
Tan et al., "ConnectBoard: A remote collaboration system that supports gaze-aware interaction and sharing", MMSP 2009: IEEE International Workshop on Multimedia Signal Processing, Oct. 5-7, 2009, Rio de Janeiro, Brazil, Abstract downloaded from internet ieeexplore.ieee.org/xpl/freeabs_all.jsp?arnumber=5293268 on Feb. 7, 2012, 1 page.
Tan et al., "ConnectBoard: Enabling Genuine Eye Contact and Accurate Gaze in Remote Collaboration", IEEE Transactions on Multimedia, vol. 13, No. 3, Jun. 2011, pp. 466-473, 9 pages.
Tan et al., "Enabling Genuine Eye Contact and Accurate Case in Remote Collabroration", Presented at IEEE International Conference on Multimedia and Expo, Jul. 19, 2010, Mobile and Media Systems Laboratory, HP Laboratories, Palo Alto, USA, pp. 430-435, 7 pages.
Tang et al., "VideoArms: Embodiments for Mixed Presence Groupware", Sep. 11-15, 2006, Copyright 2006 ACM, London, UK, 16 pages.

VNC Enterprise Edition—Product Information: Overview, Copyright 2011, RealVNC Limited, 2 pages.
Wacom Components: Input Technology, Copyright 2007 Wacom, downloaded from internet http://www.wacom-components.com/english/technology/index.html on Sep. 15, 2011, 2 pages.
Wacom Components: Input Technology: EMR Technology, Copyright 2007 Wacom, downloaded from internet http://www.wacom-components.com/english/technology/emr.html on Sep. 15, 2011, 4 pages.
Wacom Components: Input Technology: Features and Advantages of EMR Technology, Copyright 2007 Wacom, downloaded from internet http://www.wacom-components.com/english/technology/feature.html on Sep. 15, 2011, 2 pages.
Wacom Components: Input Technology: Mobile Equipment, Copyright 2007 downloaded from internet http://www.wacom-components.com/english/technology/mobile.html on Sep. 15, 2011, 3 pages.
Wacom Components: Input Technology: Penabled Technology, Copyright 2007 Wacom, downloaded from internet http://www.wacom-components.com/english/technology/penabled.html on Sep. 15, 2011, 1 page.
Wacom Components: Input Technology: Touch Technology, Copyright 2007 Wacom, downloaded from internet http://www.wacom-components.com/english/technology/touch.html on Sep. 15, 2011, 3 pages.
Wilson et al., "Combining Multiple Depth Cameras and Projectors for Interactions on, Above, and Between Surfaces", Oct. 3-6, 2010, UIST '10, ACM, New York, USA, 10 pages.
Katz, "Chemistry in the Toy Store™", 6th Edition, Updated 2002, 13 pages.
Lee, Low-Cost Multi-Point Interactive Whiteboard using the Wiimote, downloaded from internet http://www.youtube.com/watch?v=5s5EvhHy7eQ on Apr. 26, 2012, 2 pages.
Faces in Real-Life Images, downloaded from internet http://people.cs.umass.edu/~elm/realfaces/call.html on Apr. 26, 2012, 2 pages.
Face Recognition Homepage downloaded from internet http://www.face-rec.org/conferences/ on Apr. 26, 2012, 7 pages.
Sticky-Notes.net, downloaded from internet http://www.sticky-notes.net on Apr. 26, 2012, 3 pages.
Mistry, "Quickies, Intelligent Sticky Notes", MIT Media Lab, downloaded from internet http://pranavmistry.com/projects/quickies/ on Apr. 26, 2012, 4 pages.
Quickies: Sticky Notes of 21st Century, downloaded from internet http://www.youtube.com/watch?v=HQT5_4aVvHU on Apr. 26, 2012, 3 pages.
Post-It Digital Notes, downloaded from internet http://download.cnet.com?Post-it-Digital-Notes/3000-2351_4-10060027.html on Apr. 26, 2012, 7 pages.
Non-Final Office Action for U.S. Appl. No. 13/041,792 mailed Jun. 7, 2012, 17 pages.
Non-Final Office Action for U.S. Appl. No. 13/102,963 mailed on Jan. 22, 2013, 8 pages.
Non-Final Office Action for U.S. Appl. No. 13/041,910 mailed on Jan. 24, 2013, 17 pages.
Final Office Action for U.S. Appl. No. 13/041,792 mailed on Oct. 17, 2012, 18 pages.
Non-Final Office Action for U.S. Appl. No. 13/041,792 mailed on Dec. 5, 2013, 21 pages.
Notice of Allowance for U.S. Appl. No. 13/041,769 mailed on Dec. 11, 2013, 11 pages.
Notice of Allowance for U.S. Appl. No. 13/041,838 mailed on Dec. 18, 2013, 9 pages.
Advisory Action for U.S. Appl. No. 13/041,769 mailed on May 28, 2013, 4 pages.
Final Office Action for U.S. Appl. No. 13/102,963 mailed on Aug. 22, 2013, 10 pages.
Non-Final Office Action for U.S. Appl. No. 13/041,838 mailed on Sep. 5, 2013, 6 pages.
Apperley et al., "Use of Video Shadow for Small Group Interaction Awareness on a Large Interactive Display Surface", The Computer Science Department University of Waikato, Hamilton, New Zealand, 2002, 10 pages.

(56) References Cited

OTHER PUBLICATIONS

Extended European Search Report for European Application No. 12156226.8 dated May 9, 2012, 5 pages.
Final Office Action for U.S. Appl. No. 13/041,769 mailed on Mar. 5, 2013, 23 pages.
Final Office Action for U.S. Appl. No. 13/041,910 mailed on Jun. 20, 2013, 20 pages.
Office Action in related Japanese Application No. 2012-047976 dated Nov. 19, 2013, 3 pages.
Advisory Action for U.S. Appl. No. 13/102,963 mailed on Jan. 14, 2014, 3 pages.
Extended European Search Report for European Application No. 12156239.1 dated Apr. 15, 2014.
Final Office Action for U.S. Appl. No. 13/041,792 mailed on May 14, 2014, 25 pages.
Office Action in related Japanese Application No. 2012-047976 dated Apr. 15, 2014, 3 pages. (no translation available).
Notice of Allowance for U.S. Appl. No. 13/041,769 mailed on Apr. 21, 2014, 7 pages.
English translation and Notification of the First Office Action for corresponding Chinese Patent Application No. 201210055091X dated Jan. 15, 2014, 16 pages.
English translation and Notification of the First Office Action for corresponding Chinese Patent Application No. 2012100569418 dated Jun. 17, 2014, 22 pages.
Office Action in related Japanese Patent Application No. 2013-194546 dated Sep. 2, 2014, 2 pages. (no translation available).
Non-Final Office Action for U.S. Appl. No. 13/041,910 mailed on Aug. 25, 2014, 20 pages.
Notice of Allowance for U.S. Appl. No. 13/041,769 mailed on Sep. 12, 2014, 2 pages.
English Translation and Second Office Action for corresponding Japanese Patent Application No. 2012101355153 dated Feb. 13, 2015, 32 pages.
Notice of Allowance for U.S. Appl. No. 13/041,792 mailed on Jan. 28, 2015, 17 pages.
Notice of Allowance for U.S. Appl. No. 13/041,910 mailed on Mar. 16, 2015, 8 pages.
Non-Final Office Action for U.S. Appl. No. 13/102,963 mailed on Mar. 27, 2015, 9 pages.
Final Office Action for U.S. Appl. No. 13/102,963 mailed on Nov. 4, 2015, 14 pages.
Office Action in related Japanese Patent Application No. 2012-047972 dated Nov. 24, 2015, 2 pages. (no translation available).
Non-Final Office Action for U.S. Appl. No. 13/102,963 mailed on Jun. 8, 2016, 12 pages.
U.S. Appl. No. 13/102,963, "Final Office Action", Dec. 30, 2016, 12 pages.

* cited by examiner

AUTOMATED SELECTION AND SWITCHING OF DISPLAYED INFORMATION

BACKGROUND

Embodiments of the present invention relate in general to electronic collaboration, and in particular to techniques for automatically selecting and changing the information displayed by a collaborative system.

Video conferencing is widely used to facilitate "face-to-face" video/audio communication between parties located at two or more remote locations. For example, a video conference system, such as the LifeSize Room 220 provided by LifeSize Communications, Inc., allows users to switch between views of conference attendees and a computer display. This switching is performed manually by a user of the system using buttons on a remote control. This is however quite cumbersome because most users do not know how to use the remote control. Even if the use of the remote control is known, the manual switching that is required makes the process quite unwieldy, especially in back-and-forth discussion-type scenarios.

BRIEF SUMMARY

Embodiments of the present invention relate to techniques for automatically selecting information to be displayed. The displayed information may be automatically and dynamically changed in response to changes in one or more preconfigured conditions.

In one embodiment, techniques, including a method, system, and a plurality of executable instructions stored on a non-transitory computer-readable storage medium, are provided for selecting the information to be displayed, A first system may determine, based upon first information, if a condition is met and then generate a signal based upon the result of the condition check. A signal including a first set of one or more information streams may be generated upon determining that the condition is met. A signal including a second set of one or more information streams may be generated upon determining that the condition is not met, where the second set of information streams is different from the first set of information streams. For example, the second set may include at least one information stream that is not included in the first set of information streams. The first system may then cause the generated signal to be output such that information corresponding to the set of information streams included in the signal is displayed.

The condition may be of different types. In one embodiment, the condition is based upon positional information. In such an embodiment, the first information may comprise information indicative of a position of a first object. For example, the first information may comprise data generated by a depth sensor, a proximity sensor, or a pressure sensor.

In one embodiment, the condition may be considered to be met if the first object is positioned within a certain distance from a second object. For example, the second object may be a drawing surface and the first object may be a user using the drawing surface.

The first set of information streams and the second set of information streams may each include one or more streams comprising different types of information. For example, in one embodiment, the first set of information streams may comprise a first stream comprising a digital representation of a drawing captured at a second system remotely located from a first system, and a second stream comprising a digital representation of a drawing captured at the first system. The second set of information streams may comprise a third stream comprising a video stream captured at the second system, and a fourth stream comprising a video stream captured at the first system.

In one embodiment, it may be determined that the condition is met and a signal may be generated comprising a first set of one or more information streams. Subsequent to generating the signal comprising the first set of one or more information streams, it may be determined that the condition is not met. Responsive to determining that the condition is not met, the signal may be changed to generate a changed signal such that the changed signal comprises a second set of one or more information streams instead of the first set of information streams. A first system may then cause the changed signal to be output such that information corresponding to the second set of information streams included in the changed signal is displayed. In one such embodiment, the first set of information streams may comprise a first stream comprising a digital representation of a drawing captured at a second system remotely located from the first system, and a second stream comprising a digital representation of a drawing captured at the first system. The second set of information streams may comprise a third stream comprising a video stream captured at the second system, and a fourth stream comprising a video stream captured at the first system.

The foregoing, together with other features and embodiments, will become more apparent when referring to the following specification, claims, and accompanying drawings.

DETAILED DESCRIPTION

In the following description, for the purposes of explanation, numerous details are set forth in order to provide an understanding of embodiments of the present invention. It will be apparent, however, to one of ordinary skill in the art that certain embodiments can be practiced without some of these details.

Figure 1:
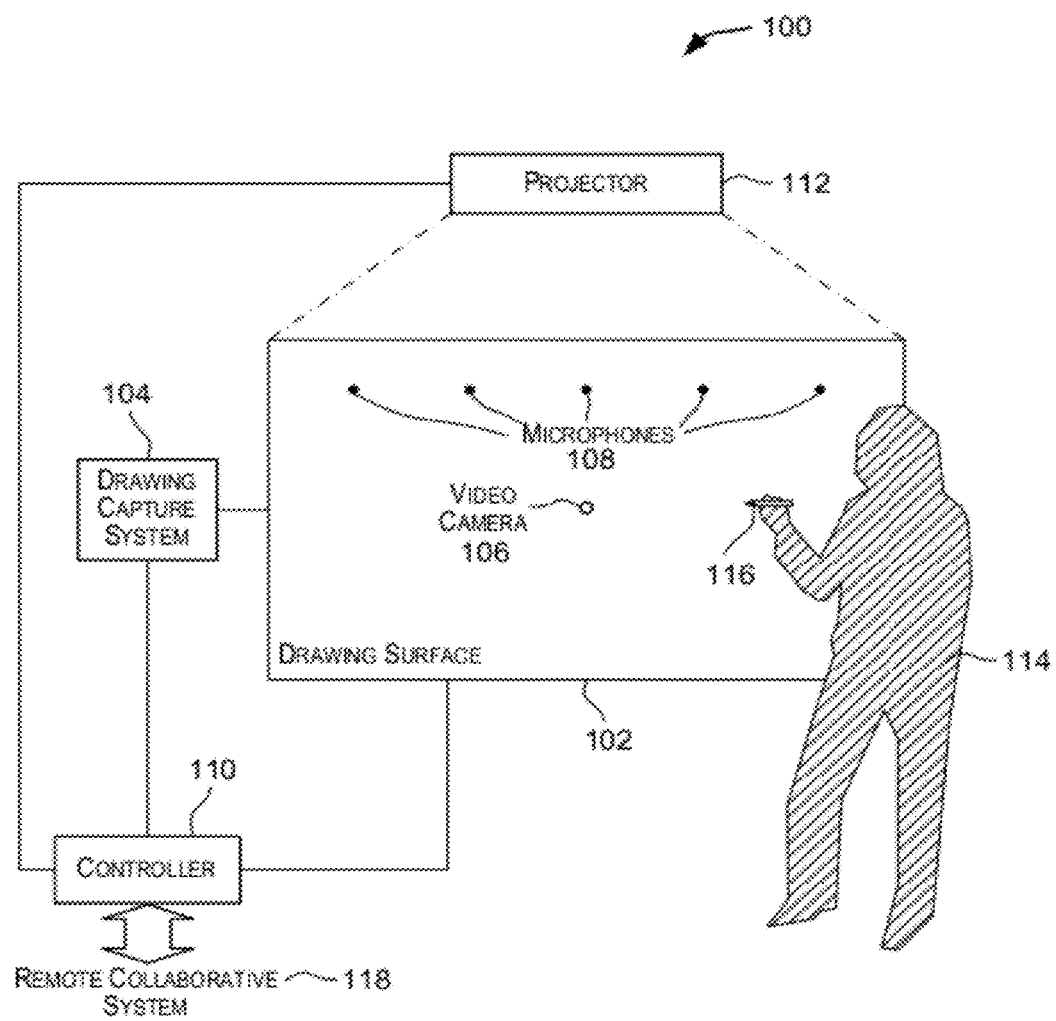
FIG. 1 is a simplified block diagram of a collaborative system in accordance with an embodiment of the present invention.

FIG. 1 is a simplified block diagram of a collaborative system 100 according to an embodiment of the present invention. As shown, collaborative system 100 can include a drawing surface 102, a drawing capture system 104, a video camera 106, microphones 108, a controller 110, and a projector 112.

Drawing surface 102 (also referred to as display surface or whiteboard) can act as both an input and output interface for collaborative system 100. As an input interface, drawing surface 102 can receive drawings (also referred to as writings) made by a user (e.g., user 114) and, in conjunction with drawing capture system 104, capture those drawings in electronic form. As an output interface, drawing surface 102 can display a video signal that includes the captured drawings and information received from a remote collaborative system (e.g., system 118). In one set of embodiments, the video signal can be projected onto drawing surface 102 by a front projector, such as projector 112.

For the purposes of the present disclosure, the term "drawing" or "writing" or "writing information" or "drawing information" may include one or more characters, letters, symbols, words, sentences, tables, drawings, sketches, figures, or any other type of input that can be provided using writing instrument 116. As another example, a writing or drawing can include hand-written letters, numbers, or symbols, expressed in any language or format. As yet another example, a writing or drawing can comprise a combination of hand-drawn pictorial and textual elements.

Drawing surface 102 can be implemented using any type of surface, board, screen, or other physical medium that can be drawn on by a user and can display information projected onto the surface. In some embodiments, drawing surface 102 can have dimensions that are similar to a conventional whiteboard or interactive whiteboard. For example, in a particular embodiment, drawing surface 102 can be at least 36 inches in width and at least 24 inches in height. In certain embodiments, drawing surface 102 can have an aspect ratio of 4:3, 16:9, , or 16:10, which are industry standard aspect ratios for TV, HDTV, and WXGA. In further embodiments, drawing surface 102 can have a depth that makes it capable of being mounted on a wall or other vertical surface. For example, in a particular embodiment, drawing surface 102 can have a depth of less than 6 inches.

In one set of embodiments, user 114 can draw on drawing surface 102 using one or more writing instruments, such as writing instrument 116. Generally speaking, writing instrument 116 can be any type of physical object usable for defining strokes on drawing surface 102. In certain embodiments, writing instrument 116 can be an instrument that does not leave any visible marks when used on drawing surface 102, such as user 114's finger, or an electronic pointer or stylus. In other embodiments, writing instrument 116 can be an instrument designed to leave visible marks, such as a pen or a conventional dry erase marker. In one embodiment, the drawing surface 102 can be capable of sensing multiple touches simultaneously allowing a user to make multiple marks at the same time.

Regardless of the nature of writing instrument 116, the drawings made by user 114 with writing instrument 116 on drawing surface 102 using writing instrument 116 can be captured by drawing capture system 104. In particular, in one embodiment, drawing capture system 104 can include one or more sensors and/or other components that enable the system to detect when user 114 places writing instrument 116 in contact with (or substantially close to) drawing surface 102 and moves instrument 116 across the surface for the purpose of drawing or writing.

In one set of embodiments, drawing capture system 104 can be an integral part of drawing surface 102. For example, drawing capture system 104 can comprise touch or multi-touch sensors (e.g., capacitive, resistive, pressure-sensitive, etc.) that are embedded in drawing surface 102. These embedded sensors can detect when writing instrument 116 has been placed against drawing surface 102 and can generate a stream of sensor data indicating the movement of instrument 116 over the surface. In these embodiments, the touch or multi-touch sensors can also detect the force with which user 114 draws upon surface 102, e.g. by the amount of pressure detected or by the area of the writing instrument that makes contact with the surface.

In an alternative set of embodiments, drawing capture system 104 can be physically separate from drawing surface 102. For example, drawing capture system 104 can comprise one or more cameras that are positioned in front of drawing surface 102 and are configured to capture images of any visible marks made on surface 102 using writing instrument 116. As another example, drawing capture system 104 can comprise one or more sensors that are external to drawing surface 102 and are configured to capture the motion of writing instrument 116 (in either two or three dimensions) when used by user 114 to draw on surface 102. In these embodiments, drawing surface 102 can be, e.g., a conventional whiteboard surface.

In some embodiments, drawing capture system 104 can be communicatively linked with writing instrument 116 to facilitate drawing capture. This link can be a wired or wireless (e.g., infrared (IR), radio-frequency (RF), electromagnetic, etc.) link.

Video camera 106 can be a conventional or specialized video capture device that is embedded in drawing surface 102 and is configured to capture video of an area in front of surface 102. In one set of embodiments, video camera 106 can be designed to have a relatively small front lens element, such that the opening needed in drawing surface 102 to accommodate the camera does not exceed a threshold size.

In certain embodiments, video camera 106 can capture a video stream of user 114 that includes a frontal view of user 114 when he/she is facing drawing surface 102. As described in further detail below, this video stream can be transmitted to remote collaborative system 118, thereby enabling users of system 118 to engage in a "face-to-face" video conference with user 114.

In a particular embodiment, video camera 106 can be slightly inset from the front plane of drawing surface 102 to avoid glare and to prevent stray light (e.g., light from projector 112) from interfering with the video capture performed by camera 106. For example, video camera 106 can be inset from the front plane of drawing surface 102 by less than ½ inch.

In parallel with the video capture performed by video camera 106, microphones 108 can capture audio information within a vicinity of drawing surface 102. For example, microphones 108 can be configured to capture a stream of audio comprising words spoken by user 114 while he/she is positioned in front of drawing surface 102. In certain embodiments, this audio stream can be synchronized with the video stream captured by video camera 106 and transmitted, along with the video stream, to remote collaboration system 118 during a video conferencing session. Although microphones 108 are shown in FIG. 1 as being embedded in drawing surface 102, in some embodiments, microphones 108 can be separate from surface 102. Further, although microphones 108 are shown in FIG. 1 as being distinct from video camera 106, in some embodiments microphones 108 can be integrated into camera 106.

Controller 110 can act as a central processing component for coordinating the various components of collaborative system 100 and for enabling the collaborative functions provided by system 100. In one set of embodiments, controller 110 can be implemented using a computer system such as system 1000 described with respect to FIG. 10 below. In alternative embodiments, controller 110 can be implemented using a processor, a programmable logic device, or the like.

As shown in FIG. 1, controller 110 can be communicatively coupled with drawing surface 102, drawing capture system 104, projector 112, and remote collaborative system 118. In one set of embodiments, controller 110 can receive information from drawing capture system 104 corresponding to one or more drawings captured from drawing surface 102. Controller 110 can then process the received information to determine digital information representing the captured drawings. For example, the information received from drawing capture system 104 can comprise a raw stream of sensor data, such as pressure readings, two (or three) dimensional coordinates, or the like. Controller 110 can process the raw sensor data to generate a high-level digital representation of the captured drawings, such as a time-ordered series of strokes, a pixel-based image, or plain or formatted text.

Concurrently with receiving information from drawing capture system 104, controller 110 can receive information from remote collaborative system 118 representing drawing information and/or video/audio information captured at system 118. For example, in one set of embodiments, remote collaborative system 118 can be substantially similar in configuration to collaborative system 100, with a remote drawing surface, a remote drawing capture system, a remote video camera, remote microphones, a remote controller, and the like. In these embodiments, controller 110 can receive from remote collaborative system 118 digital information representing drawings made by a remote user on the remote drawing surface (and captured via the remote drawing system), and/or video/audio streams (e.g., of the remote user) captured by the remote video camera and remote microphones.

Based on (1) the digital information representing drawings made by user 114 on drawing surface 102, (2) the digital information representing drawings made by the remote user on the remote drawing surface, and (3) the video stream captured by the remote video camera, controller 110 can generate a video signal for projection onto drawing surface 102 (via, e.g., projector 112) that incorporates (1), (2), and (3). In this manner, user 114 can simultaneously view on drawing surface 102 the drawings made locally and remotely, as well as a "face-to-face" video feed of the remote user at remote collaborative system 118. In one set of embodiments, user 114 can interact with the projected drawings by making further drawings or strokes on drawing surface 102 with writing instrument 116 (or another instrument, such as an erasing instrument). The further drawings or strokes can be captured by drawing capture system 104 and processed by controller 110 to update the projected video signal.

It should be noted that, in some cases, controller 110 may not have any information regarding drawings made on drawing surface 102 or drawings made on the remote drawing surface of system 118 at the time of generating the video signal. This can occur, for example, if user 114 has not yet drawn on drawing surface 102 and the remote user at system 118 has not yet drawn on the remote drawing surface. In these situations, the generated video signal can simply include the video stream of the remote user at remote collaborative system 118 (or an image of, e. g., a document or some other piece of shared information as discussed with respect to FIG. 5 below).

In parallel with generating the video signal described above for projection onto local drawing surface 102, controller 110 can send information to remote collaborative system 118 for enabling projection of a corresponding video signal onto the remote drawing surface of system 118. For example, controller 110 can receive from drawing surface 102 video/audio streams of user 114 captured by video camera 106 and microphones 108. Controller 110 can then send these video/audio streams, along with the digital information representing drawings made by user 114 on drawing surface 102 (if available), to remote collaborative system 118. At system 118, the remote controller can construct an appropriate video signal based on this information for projection onto the remote drawing surface. The remote user at system 118 can then view/interact with the projected video in a similar manner as described for user 114.

Projector 112 can be any type of device capable of projecting a video signal or image onto a surface while being positioned in front of the surface (e.g., a front projector). As described above, in one set of embodiments projector 112 can receive a video signal from controller 110 that includes drawings made locally by user 114, drawings made remotely at remote collaborative system 118, and/or a video stream captured remotely at remote collaborative system 118. Projector 112 can then project the video signal onto drawing surface 102. In a particular embodiment, projector 112 can project the video signal such that the projected representation of a particular drawing made on drawing surface 102 appears at the same place on surface 102 that it was originally drawn. In a further embodiment, projector 112 can project the video signal such that the projected representation of a particular drawing made on the remote drawing surface of system 118 appears on drawing surface 102 at the same place it was originally drawn on the remote drawing surface.

In one set of embodiments, projector 112 can be configured and/or positioned such that the light cast by the projector onto drawing surface 102 does not substantially interfere with the video capture performed by video camera 106. In one embodiment, projector 112 can be an ultra-short-throw (UST) front projector that has a throw ratio (defined as the distance of the projector lens to drawing surface 102 divided by the width of the projected image) of less than 0.4. An example of such a projector is the CP-AW250NM produced by Hitachi, Ltd. In another embodiment, projector 112 can be positioned within 60 inches of the front plane of drawing surface 102.

It should be appreciated that FIG. 1 is illustrative and not intended to limit embodiments of the present invention. For example, system 100 can have other capabilities or have more or fewer components than those depicted in FIG. 1. One of ordinary skill in the art will recognize other variations, modifications, and alternatives.

Figure 2:
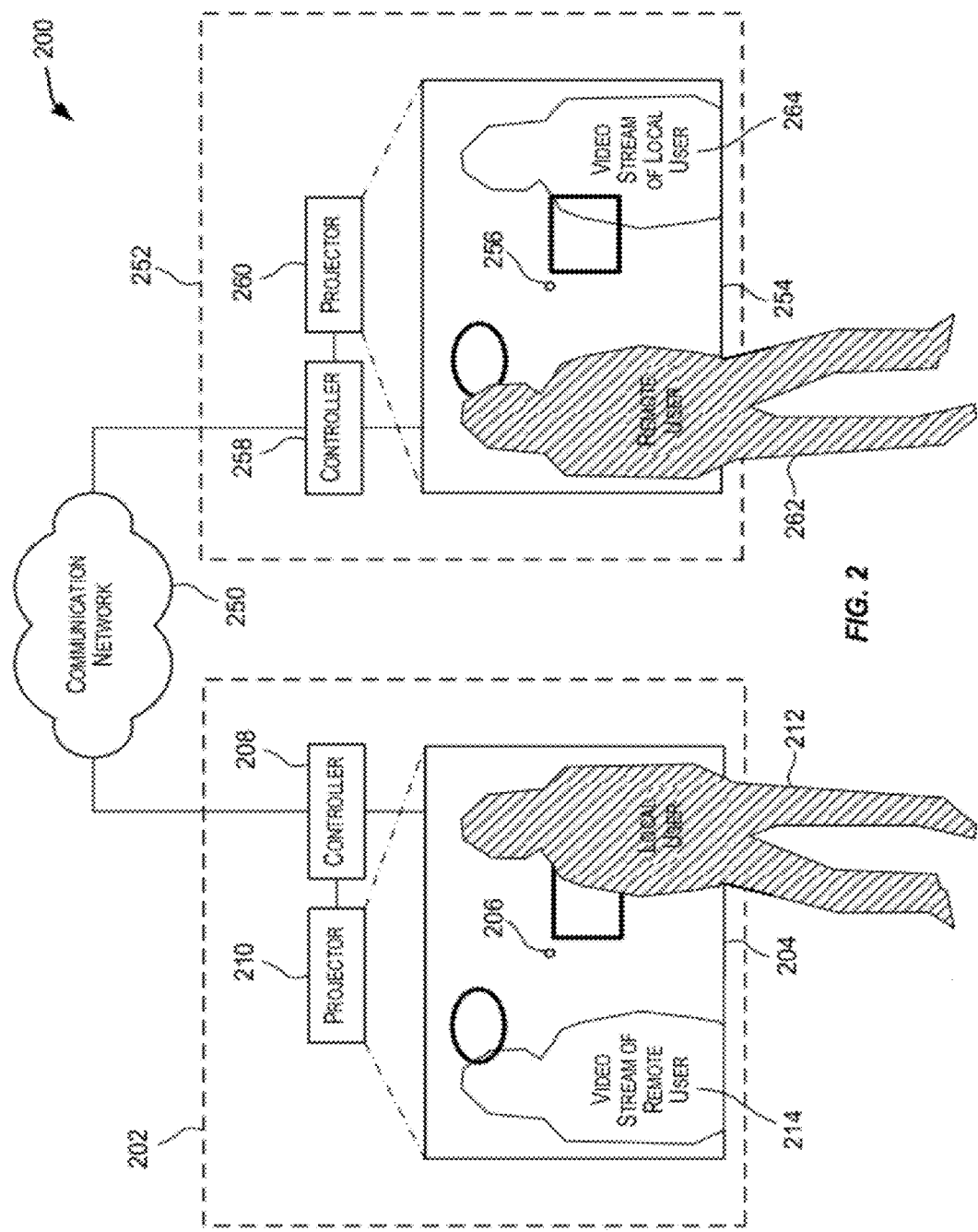
FIG. 2 is a simplified block diagram of an environment in which multiple collaborative systems can be networked in accordance with an embodiment of the present invention.

FIG. 2 is a simplified block diagram of an environment 200 in which multiple collaborative systems can be networked according to an embodiment of the present invention. FIG. 2 is provided to illustrate one exemplary flow of how the users of these networked systems can engage in a face-to-face video conference while interactively sharing drawings and/or other information.

As shown, environment 200 can include a local collaborative system 202 communicatively coupled with a remote collaborative system 252 via a communication network 250. Local collaborative system 202 and remote collaborative system 252 can each be substantially similar in configuration to collaborative system 100 of FIG. 1. For example, systems 202 and 252 can each include respective drawing surfaces (204, 254), video cameras (206, 256), controllers (208, 258), and projectors (210, 260). Systems 202 and 252 can also include other components that are described with respect to collaborative system 100 of FIG. 1. For instance, although not depicted, drawing surfaces 204 and 254 of systems 202 and 252 can each incorporate a drawing capture system and microphones that are similar to drawing capture system 104 and microphones 108 of system 100.

Communication network 250 can be any type of network that enables data communication, such as a local area network (LAN), a wide-area network (WAN), a virtual private network (e.g., VPN), a metro-area network (MAN), or the Internet. In certain embodiments, communication network 250 can comprise a collection of interconnected networks.

In one set of embodiments, a local user 212 operating local collaborative system 202 can establish a connection between system 202 and remote collaborative system 252 for the purpose of engaging in an interactive video conference with remote user 262. This setup task can be carried out by local user 212 via a user interface projected onto local drawing surface 204 via local projector 210 (UI not shown), where the user interface can include, e.g., a UI element for selecting or entering an IP address or name of remote collaborative system 252.

Once the connection has been established, local video camera 206 of local collaborative system 202 can begin capturing video and audio streams of local user 212 and can send the video/audio streams to local controller 208. Local controller 208 can then begin transmitting these video/audio streams to remote controller 258 of remote collaborative system 252. At the same time, remote video camera 256 of remote collaborative system 252 can being capturing video and audio streams of remote user 262 and can send the video/audio streams to remote controller 258. Remote controller 258 can then begin transmitting these video/audio streams to local controller 208 of local collaborative system 202.

Upon receiving the video/audio streams from remote controller 258, local controller 208 can generate a video signal including the received video stream for projection onto local drawing surface 204 via local projector 210. Similarly, upon receiving the video/audio streams from local controller 208, remote controller 258 can generate a video signal including the received video stream for projection onto remote drawing surface 254 via remote projector 260. In this manner, local user 212 and remote user 262 can view each other via their respective drawing surfaces and can engage in a video conference.

Since local video camera 206 is designed to face outward from the front plane of local drawing surface 204 (and since local user 212 will likely be facing surface 204), the video stream of local user 212 projected onto remote drawing surface 254 (i.e., video stream 264) can present a frontal view of local user 212. Similarly, since remote video camera 256 is designed to face outward from the front plane of remote drawing surface 254 (and since remote user 262 will likely be facing surface 254), the video stream of remote user 262 projected onto local drawing surface 204 (i.e., video stream 214) can present a frontal view of remote user 262. Thus, local user 212 and remote user 262 can have the impression of engaging in a face-to-face communication. In FIG. 2, streams 214 and 264 are depicted using simple line art; however, in actual operation, streams 214 and 264 can comprise standard or high resolution video images.

In certain embodiments, the video streams of local user 212 and remote user 262 can be mirrored prior to being projected onto remote drawing surface 254 and local drawing surface 204 respectively. This can ensure that any gestures made by one user with respect to his/her drawing surface appear to be oriented correctly to the other user. For example, if local user 212 points to a location on the right hand side of local drawing surface 204, that gesture will be horizontally flipped (i.e., appear to point to the left hand side) when captured by local video camera 206. Thus, the video stream of local user 212 needs to be mirrored so that local user 212 appears to be pointing to the right hand side of remote drawing surface 254 when viewed by remote user 262. In various embodiments, this mirroring can be performed by the controller transmitting the video stream or the controller receiving the video stream.

At some point during the video conferencing session, local user 212 and/or remote user 262 can begin drawing (using a writing instrument such as 116 of FIG. 1) on his/her respective drawing surface. For example, assume local user 212 draws a rectangle on local drawing surface 204. In response, local drawing surface 204 can capture the drawing of the rectangle and send drawing capture information to local controller 208. Local controller 208 can then determine, based on the drawing capture information, digital information representing the rectangle (e.g., a stroke-based or pixel based representation). Local controller 208 can further generate, based on the digital information and video stream 214, an updated video signal that includes the rectangle and the video stream, and can transmit the updated video signal to local projector 210 for projection onto local drawing surface 204.

At the same time, local controller 208 can transmit the digital information representing the rectangle to remote controller 258, which can generate, based on the digital information and video stream 264, an updated video signal that includes the rectangle and the video stream, and can transmit the updated video signal to remote projector 260 for projection onto remote drawing surface 254.

In this manner, the drawings made by local user 212 (i.e., the rectangle) can be displayed in electronic form at both the local and remote drawing surfaces. In essence, this provides an environment in which local user 212 and remote user 262 have the impression of sharing a single drawing surface.

As a further example, assume that remote user 262 subsequently draws an ellipse on remote drawing surface 254. In response, remote drawing surface 254 can capture the drawing of the ellipse and send drawing capture information to remote controller 258. Remote controller 258 can then determine, based on the drawing capture information, digital information representing the ellipse. Remote controller 258 can further generate, based on the digital information representing the ellipse, the digital information representing the rectangle, and video stream 214, an updated video signal that includes the ellipse, the rectangle, and the video stream, and can transmit the updated video signal to remote projector 260 for projection onto remote drawing surface 254.

At the same time, remote controller 258 can transmit the digital information representing the ellipse to local controller 208, which can generate, based on the digital information representing the ellipse, the digital information representing the rectangle, and video stream 264, an updated video signal that includes the ellipse, the rectangle, and the video stream, and can transmit the updated video signal to local projector 210 for projection onto local drawing surface 204.

Thus, like the rectangle drawn by local user 212, the ellipse drawn by remote user 262 can be displayed in electronic form at both the local and remote drawing surfaces. In one set of embodiments, these drawings can be laid over video streams 214 and 264 when displayed on drawing surfaces 204 and 254 respectively (as shown in FIG. 2). In other embodiments, the relative positioning of drawings and video streams 214/264 can differ based on one or more factors (discussed in greater detail with respect to FIGS. 4 and 5 below).

Subsequent to the flow described above, local user 212 and remote user 262 can interact further by making additional drawings or strokes on their respective drawing surfaces. These additional drawings or strokes can be captured and displayed on both sides. This interaction can continue indefinitely until either the local user or the remote user ends the session.

It should be appreciated that FIG. 2 is illustrative and not intended to limit embodiments of the present invention. For example, although only two collaborative systems are shown in FIG. 2, any number of such systems can be networked together and can be participants in an interactive video conference session. Further, the flow described with respect to FIG. 2 can be modified in various ways. For example, in certain embodiments remote user 262 can begin drawing prior to local user 212, or the two users can draw on their respective drawing surfaces at substantially the same time. Regardless of the sequencing, the drawings made by one user can be viewed and manipulated on both the local and remote sides.

Figure 3:
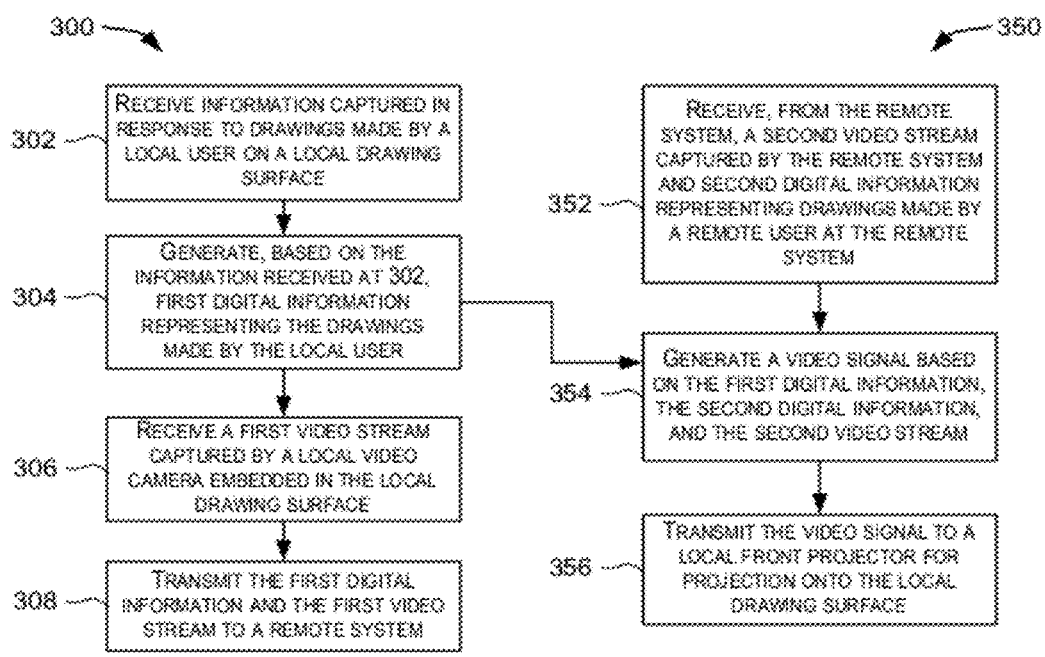
FIG. 3 is a flow diagram of processes that can be performed by a collaborative system in accordance with an embodiment of the present invention.

FIG. 3 is a flow diagram of parallel processes 300 and 350 that can be performed by local collaborative system 202 of FIG. 2 when participating in an interactive video conferencing session with remote collaborative system 252 according to an embodiment of the present invention. In particular, processes 300 and 350 can be carried out by local controller 208 of system 202. Processes 300 and 350 can be implemented in hardware, software, or a combination thereof. As software, processes 300 and 350 can be encoded as program code stored on a computer-readable storage medium.

At block 302, local controller 208 of local collaborative system 202 can receive information captured in response to drawings made by local user 212 on local drawing surface 204. This information can be in the form of, e.g., sensor readings captured by one or more sensors embedded in surface 204.

At block 304, local controller 208 can generate, based on the information received at 302, first digital information representing the captured drawings. For example, the first digital information can correspond to a time-ordered series of strokes, a pixel-based image, plain text or formatted text, or the like. In certain embodiments, the information received at block 302 may already be formatted in a manner that does not require any further processing by local controller 208. In these embodiments, block 304 can be omitted.

At the same time as receiving drawing capture information, local controller 208 can receive a first video stream being captured by local video camera 206 embedded in local drawing surface 204 (block 306). This first video stream can include, for example, a frontal view of local user 212 as he is standing (or sitting) in front of surface 204. Although not shown in FIG. 3, local controller 208 can also receive an audio stream simultaneously with the first video stream. The audio stream can include, for example, words spoken by local user 212 and/or other sounds in the vicinity of local drawing surface 204.

At block 308, local controller 208 can transmit the first digital information generated at block 304 and the first video stream received at block 306 to remote controller 258 of remote collaborative system 252. Remote controller 258 can then process the received information and generate an appropriate video signal for projection onto remote drawing surface 254 (via, e.g., remote projector 260).

In a process 350 (which may be executed in parallel with process 300 or in a serialized manner), local controller 208 can receive, from remote controller 258, a second video stream captured by remote video camera 256 and/or second digital information representing drawings made by remote user 262 on remote drawing surface 254 (block 352). At block 354, local controller 208 can generate a video signal for projection onto local drawing surface 204 based on the first digital information generated at block 302 or 304, the second digital information, and the second video stream. If local controller 208 had previously generated such a video signal, the processing of block 354 can comprise generating an updated video signal.

At block 356, local controller 208 can then transmit the generated video signal to local front projector 210 for projection onto local drawing surface 204. In various embodiments, the video signal can include the drawings made by local user 212, the drawings made by remote user 262, and the video stream captured by remote video camera 256 (of, e.g., remote user 262). In this manner, local user 212 can simultaneously view on surface 204 the drawings made locally and remotely, as well as a "face-to-face" video feed of remote user 262. Different formats may be used for displaying the information on surface 204. For example, a picture-in-picture format may be used wherein the larger picture displays video captured at the remote collaborative system and a smaller picture-in-picture is used to display video captured at the local collaborative system.

It should be appreciated that processes 300 and 350 are illustrative and that variations and modifications are possible. Steps described as sequential can be executed in parallel, order of steps can be varied, and steps can be modified, combined, added, or omitted. One of ordinary skill in the art would recognize other variations, modifications, and alternatives.

Figure 4:
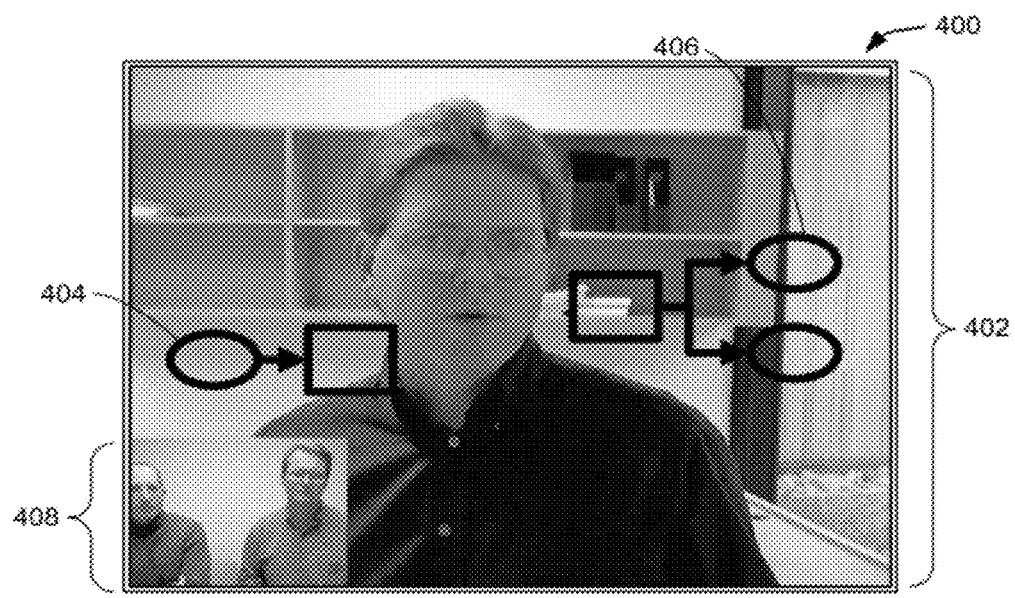
FIGS. 4 and 5 are simplified depictions of video signals that can be generated for projection onto a drawing surface in accordance with an embodiment of the present inventions.

In one set of embodiments, the video signal generated at block 354 of FIG. 3 can be configured such that the drawings captured from local drawing surface 204 and remote drawing surface 254 are laid over the video stream received from remote collaborative system 252. FIG. 4 illustrates an example frame 400 from such a video signal. As shown, frame 400 includes a video stream 402 (e.g., of remote user 262) that encompasses nearly the entire height and width of the frame. Laid on top of video stream 402 are drawings 404 and 406 that represent drawings that have been made on both the local and remote sites. This type of configuration enables local user 212 to easily view the remote user and the drawings as a single composite image on local drawing surface 204. In one embodiment, video stream 402 can be made semi-transparent above a white background, thereby allowing drawings 404 and 406 to visually stand out against the video stream. In another embodiment, frame 400 can include a small window 408 (e.g., a picture-in-picture format) for displaying the video stream being captured of local user 212. As can be seen in FIG. 4, video stream 408 shows multiple users at local collaborative system 202. There may be one or more users at the local collaborative system or remote collaborative system.

Figure 5:
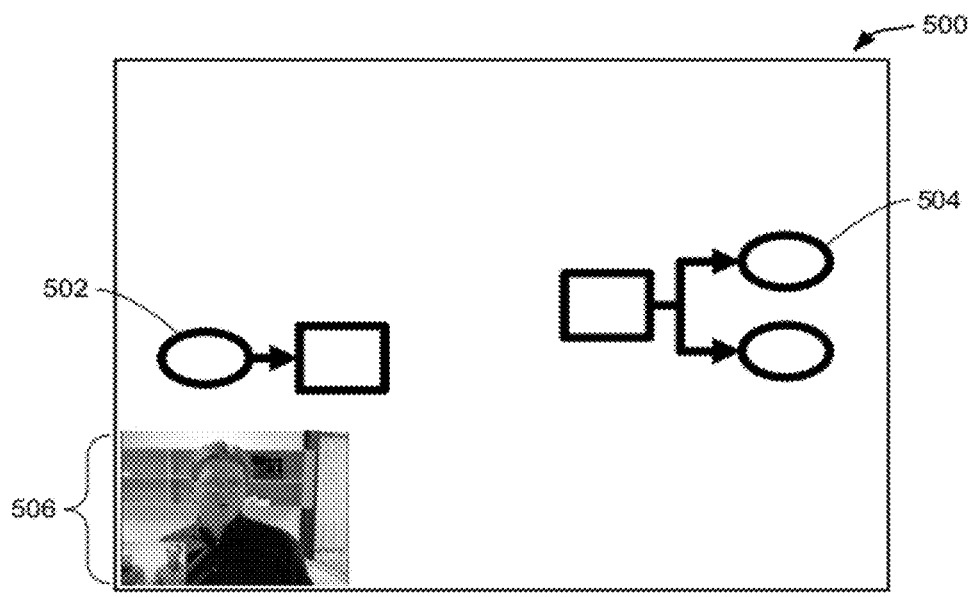

In alternative embodiments, the video signal generated at block 354 of FIG. 3 can be configured such that the drawings captured from local drawing surface 204 and remote drawing surface 254 are displayed over a static background. For instance, FIG. 5 illustrates an example frame 500 from such a video signal where drawings 502 and 504 are displayed. This configuration can be preferable, for example, if the video streams captured at local collaborative system 202 and received from remote collaborative system 252 make it difficult to see drawings 502 and 504 when laid over the video streams. In these embodiments, the received video streams can still be shown on local drawing surface 204, but may cover a smaller area 506 as shown in FIG. 5.

Figure 6:
FIG. 6 is a simplified depiction of information comprising video streams that may be displayed on a surface according to an embodiment of the present invention.

In another embodiment, as shown by frame 600 depicted in FIG. 6, the video stream that is generated by local controller 208 and projected by the local projector 210 onto local surface 204 may be configured such that it includes a video signal captured at remote collaborative system 252 (e.g., a video stream 602 of remote user 262) that encompasses nearly the entire height and width of the frame and a video stream captured at local collaborative system 202 (e.g., video stream 604 of local users 212). In this instance, digital representations of drawings captured at either local collaborative system 202 or remote collaborative system 252 are not shown. This type of configuration enables local user 212 to easily view the remote user and facilitates face-to-face discussion without being distracted by images corresponding to the drawings.

In one embodiment (not shown), only the video stream captured at remote collaborative system 252 may be displayed on local surface 204 without displaying the video stream captured at the local collaborative system or the digital representations of the drawings captured at the local and remote sites. For example, in such an embodiment, only video stream 602 may be shown and not video stream 604.

Figure 7:
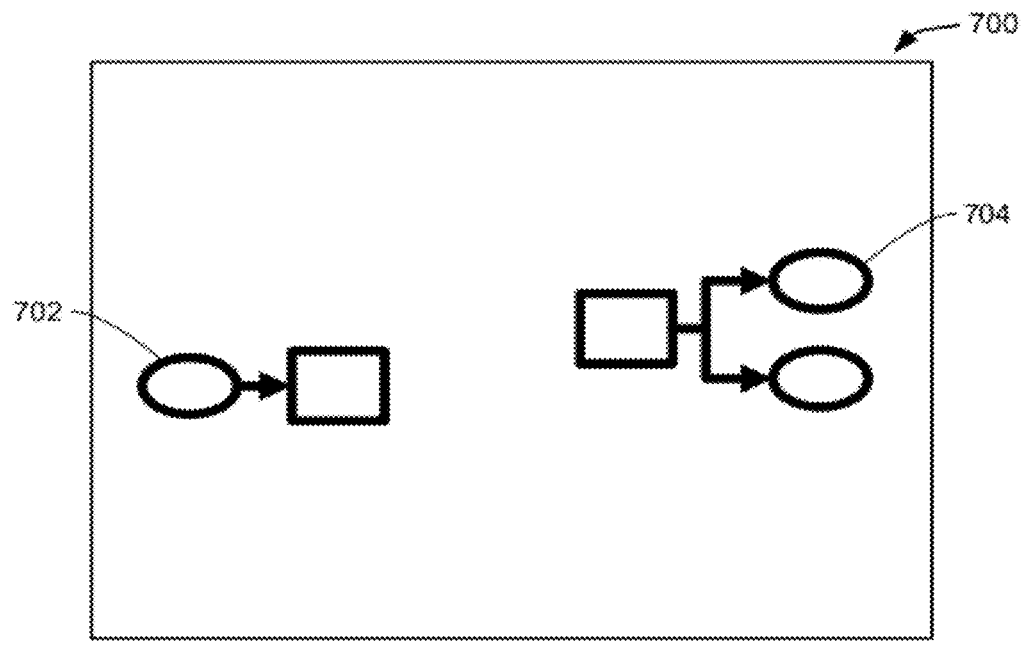
FIG. 7 is a simplified depiction of information comprising digital representations corresponding to captured drawings that may be displayed on a surface according to an embodiment of the present invention.

In yet another embodiment, as shown by frame 700 depicted in FIG. 7, the video stream that is generated by local controller 208 and projected by the local projector 210 onto local surface 204 may be configured such that it includes only digital representations 702 and 704 of drawings captured at local collaborative system 202 and remote collaborative system 252. In this embodiment, video streams captured at the local or remote collaborative systems are not shown. This type of configuration enables local user 212 to more easily view and concentrate on the drawings made on the local and remote whiteboards without being distracted by the video streams.

In the embodiments depicted in FIGS. 4, 5, 6, and 7, various combinations of video streams captured at the local and remote collaborative systems and digital representations of drawings captured at the local and remote collaborative systems may be displayed. In alternative embodiments, other information streams may also be displayed such as information streams comprising a slides presentation, a word processing document, etc. In one embodiment, these other information streams may be incorporated into the video signal that is projected by a projector of a collaborative system. In alternative embodiments, the other information streams may be output from sources other than a projector of the collaborative system. These other sources may be, for example, another projector, a computer, or any output device.

As described above, a controller of a collaborative system generates a signal (e.g., a video signal), which is then communicated to a projector of the collaborative system. The projector then projects the video signal onto a drawing surface of the collaborative system. For example, in the embodiment depicted in FIG. 2, local controller 208 is configured to generate a video signal, which is communicated to local projector 210, which in turn is configured to project the video signal onto local surface 204 such that the information contained in the video signal can be viewed by users of collaborative system 202.

In one embodiment, the video signal generated by the controller may be based upon (1) digital representations of locally captured drawings (i.e., digital information corresponding to drawings captured at the local collaborative system); (2) digital representations of remotely captured drawings (i.e., digital information corresponding to drawings captured at a remote collaborative system); (3) a video stream captured by a camera at the local collaborative system; and (4) a video stream captured by a video camera at a remote collaborative system. For example, the video signal generated by local controller 208 in FIG. 2 may be based upon digital representations of drawings captured locally at collaborative system 202, digital representations of drawings captured at remote collaborative system 252, a video stream captured by a local video camera at collaborative system 202 (e.g., camera 206 that can capture a frontal view of local user 212), and a video stream captured by a video camera at remote collaborative system 252 (e.g., camera 256 that can capture a frontal view of remote user 262).

In one embodiment, local controller 208 is configured to programmatically determine the information that is to be included in the signal that is generated and sent to the projector. For example, local controller 208 is configured to determine which of the digital representations and/or video streams are to be included in the video signal that is generated and sent to local projector 210 for projection on local surface 204. By controlling the information that is included in the generated video signal, local controller 208 in effect controls the information that is displayed or projected onto surface 204, which serves as a common shared display area for displaying the various pieces of information.

Figure 8:
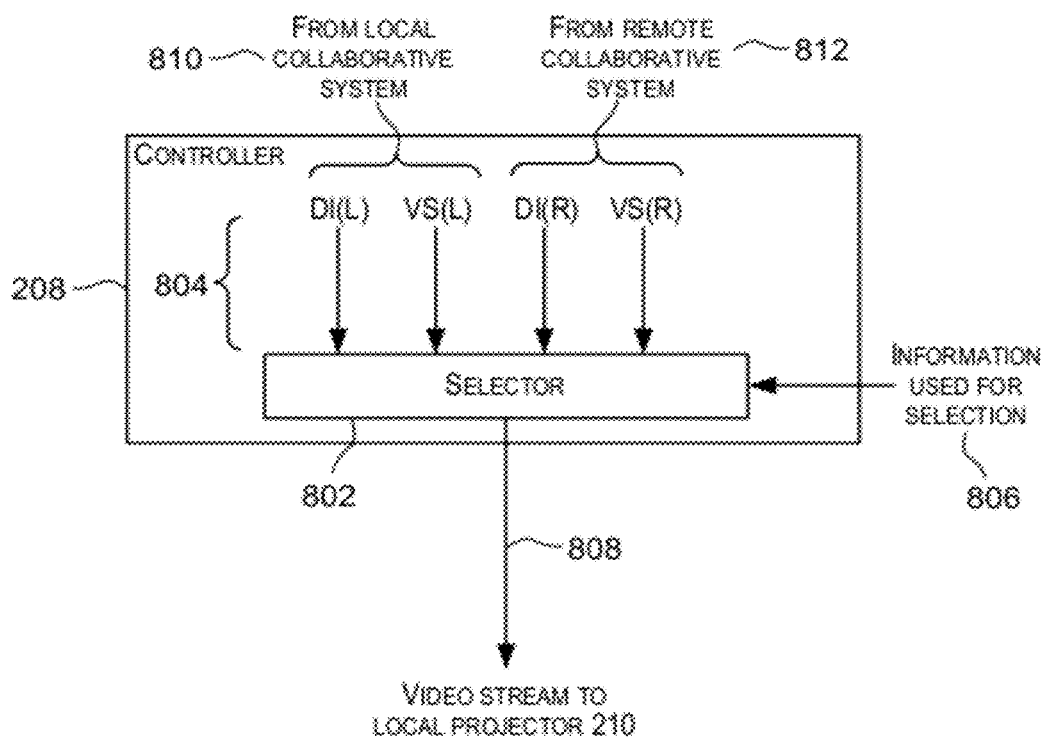
FIG. 8 depicts a simplified block diagram of a local controller according to an embodiment of the present invention.

FIG. 8 depicts a simplified block diagram of local controller 208 according to an embodiment of the present invention. As shown, controller 208 comprises a selector module 802 that is configured to receive multiple information streams as inputs 804 and generate an output signal 808 (e.g., a video signal or video stream) comprising one or more of the multiple information streams 804. The output video signal 808 generated by selector 802 is then communicated to local projector 210, which then projects the signal onto local surface 204 such that the information contained in signal 808 is displayed and made viewable to users of local collaborative system 202. Selector 802 may be implemented in hardware, or software (e.g., code, instructions, program executable by a processor), or combinations thereof The inputs to selector 802 may include inputs 810 from local collaborative system 202 and also inputs 812 from remote local collaborative system 252. For example, as shown in FIG. 8, inputs 810 may include a stream comprising digital representations determined by local controller 208 for drawings captured at local collaborative system 202 (e.g., drawings made on local surface 204) and a video stream captured at local collaborative system 202 (e.g., a video stream captured by video camera 206 positioned on local surface 204). Inputs 812 to selector 802 may correspond to information received by local collaborative system 202 from remote collaborative system 252. For example, inputs 812 may include a stream comprising digital representations determined by remote controller 258 for drawings captured at remote collaborative system 252 (e.g., drawings made on remote surface 254) and a video stream captured at remote collaborative system 252 (e.g., a video stream captured by video camera 256 positioned on remote surface 254).

There are various ways in which a collaborative system may receive information captured at one or more remote collaborative systems. In one embodiment, local collaborative system 202 may be connected to remote collaborative system 252 over a LAN or WAN using a shared messaging service that complies with the Java Message Server (JMS) specification. Each stroke captured from either the remote or local collaborative system can be published to the same channel or "topic" at the JMS and all connected devices subscribed to that topic receive the messages. In this manner, any stroke published to the channel is received by all collaborative systems. One skilled in the art will recognize that there are many systems for sharing information over a LAN or WAN and many means for doing so.

Selector 802 is configured to generate an output signal (e.g., a video stream) 808 based upon inputs 804. Selector 802 may include one or more of inputs 804 in video stream 808 that is generated and communicated to local projector 210 for projection onto local surface 204. For example, in one instance, selector 802 may include both the digital representations corresponding to drawings captured at local collaborative system 202 and remote collaborative system 252 and video streams captured at local collaborative system 202 and remote collaborative system 252 in video stream 808 that is generated and output to local projector 210. Local projector 210 may then project the received video stream 808 onto local surface 204. Such a configuration may result in the output frame shown in FIG. 4. As shown in FIG. 4, frame 400 includes a video stream 402 (e.g., of remote user 262), digital representations 404 and 406 of drawings made on both the local and remote sites, and a small window 408 for displaying the video stream being captured at local collaborative system 202 (e.g., of local user 212).

In another instance, selector 802 may include only the digital representations corresponding to drawings captured at local collaborative system 202 and remote collaborative system 252 in video stream 808 that is generated and output to local projector 210. Local projector 210 may then project the received video stream 808 onto local surface 204. Such a configuration may result in the output shown in FIG. 7. As shown in FIG. 7, frame 700 includes digital representations 702 and 704 of drawings made on both the local and remote sites.

In yet another instance, selector 802 may include only the video streams captured at local collaborative system 202 and remote collaborative system 252 in video stream 808 that is generated and output to local projector 210. Local projector 210 may then project the received video stream 808 onto local surface 204. Such a configuration may result in the output shown in FIG. 6. As shown in FIG. 6, frame 600 includes a video stream 602 captured at remote collaborative system 252 (e.g., a video stream of remote user 262) and a video stream 604 captured at local collaborative system 202 (e.g., a video stream of local user 212).

In another embodiment, selector 802 may include only the digital representations corresponding to drawings captured at local collaborative system 202 and remote collaborative system 252 and the video stream captured at remote collaborative system 252 in video stream 808 that is generated and output to local projector 210. Local projector 210 may then project the received video stream 808 onto local surface 204. Such a configuration may result in the output frame shown in FIG. 5. As shown in FIG. 5, frame 500 includes a video stream 506 captured at remote collaborative system 252 (e.g., a video stream of remote user 262) and digital representations 502 and 504 of drawings made on the local and remote sites.

In alternative embodiments, selector 802 may be configured to generate video stream 808 based upon other combinations of the inputs that it receives. In one embodiment, selector 802 decides which of its inputs to include in video stream 808 based upon selection information 806 accessible to selector 802. Selection information 806 may be received from different sources including components of local collaborative system 202 or other components. In one embodiment, selector 802 processes selection information 806 and then determines, based upon the processing results, the one or more input information streams to be included in video stream 808 sent to local projector 210.

In one embodiment, selection information 806 may be continuously or periodically monitored and changes in selection information 806 may cause the information included in video stream 808 to be dynamically changed. For example, in one embodiment, selector 802 may use selection information 806 to determine whether a particular condition (C) is met. Upon determining that condition C is met, based upon selection information 806, selector 802 may be configured to include a first set of one or more of its input information streams in video stream 808 sent to local projector 210. However, if it is determined that condition C is not met, then selector 802 may be configured to include a second set of one or more of its input information streams in video stream 808 that is sent to local projector 210. The first set of information streams may be different from the second set of information streams.

For example, in one embodiment, the first set of information streams may include only streams comprising the digital representations corresponding to drawings captured at local collaborative system 202 and remote collaborative system 252. The projection of such a video stream on local surface 204 by local projector 210 may result in information being displayed as depicted in FIG. 7. The second set of information streams may include only the video streams captured at local collaborative system 202 and remote collaborative system 252. The projection of such a video stream on local surface 204 by local projector 210 may result in information being displayed as depicted in FIG. 6. Accordingly, in one embodiment, if condition C is met then the information may be displayed as depicted in FIG. 7, and if condition C is not met, then information may be displayed as depicted in FIG. 6. Further, the selection information may change with the passage of time and as a result whether or not condition C is met may also change with time. Selector 802 is configured to automatically and dynamically switch between the view depicted in FIG. 7 and the view depicted in FIG. 6 depending upon whether or not condition C is met, which is based upon selection information 806.

In one embodiment, the selection of information streams to be included in video stream 808 may be based upon positional information. For example, the selection may be based upon the position of a first object with respect to another object. In one embodiment, the selection may be based upon the position of a user (either local or remote) with respect to the drawing surface of a collaborative system. For example, the selection of information streams to be included in video stream 808 by selector 802 of local controller 208 may be based upon the position of remote user 262 with respect to remote surface 254. In such an embodiment, condition C and the information to be displayed when condition C is met or not met may be configured as follows:

C=Remote user 262 is within a distance D of remote surface 254?

If C is met (i.e., the answer to the above questions is "yes"), then include only the digital representations corresponding to drawings captured at local collaborative system 202 and remote collaborative system 252 in video stream 808.

If C is not met, then include only the video streams captured at local collaborative system 202 and remote collaborative system 252 in video stream 808.

In such an embodiment, video stream 808 configured by selector 802 and the information included in that video stream (and eventually projected onto local surface 204) depends upon the position of remote user 262 with respect to remote surface 254. Depending upon the position of remote user 262, the information projected on local surface 204 may automatically and dynamically switch between the views in FIGS. 7 (when condition C is met) and 6 (when condition C is not met). In this embodiment, if remote user 262 moves to within distance D of surface 254 (e.g., for the purpose of drawing on the surface), local controller 208 can configure video signal 808 to include digital representations of the drawings as shown in FIG. 7. If remote user 262 steps away from remote drawing surface 254 (i.e., not within distance D), local controller 208 configures video signal 808 to include the video streams captured at the local and remote sites as shown in FIG. 6.

In an embodiment where a user's position (either local or remote) is used to select the information streams to be included in the video stream sent to the projector for projection, selection information 806 may comprise positional information indicative of the user's position. Various sensors and/or devices may be used to generate information that may be used to determine the user's position. For example, in one embodiment, camera 256 positioned on or near remote surface 254 may be used to determine the position of user 262 with respect to remote surface 254. Camera 256 may be configured to point at and autofocus on user 262. As the position of user 262 changes with respect to remote surface 254, the autofocus distance of camera 256 also changes to maintain focus on the user. The camera's autofocus can then be used to determine the position of user 262 with respect to drawing surface 254.

In another embodiment, one or more proximity sensors may be used to determine the distance of remote user 262 from remote surface 254. One or more of these proximity sensors may operate on reflected ultrasonic pulses or infrared (IR) pulses to gauge distance. The output of these sensors may be forwarded to local controller 208, which uses this information to determine whether condition C is met, and then select the information streams to be included in the video stream sent to local projector 210 for projection onto local surface 204.

In yet another embodiment, one or more depth sensors (e.g., depth sensors provided by PrimeSense Ltd.) may be used to track the physical location of a user. For example, such depth sensors may be placed on or near remote surface 254 such that the position of remote user 262 with respect to remote surface 254 can be tracked. The output of these sensors may be forwarded to local controller 208 for selecting the information streams to be included in video stream 808 sent to local projector 210 for projection onto local surface 204.

In another embodiment, pressure distribution sensors in the form of force sensitive resistance grids (e.g., those available from TekScan, Inc. in South Boston, Mass.) may be used to track a user's position with respect to a drawing surface. For example, pressure distribution sensors may be placed in an area on the ground in front of and proximal to remote surface 254 such that the position of a user's feet standing at surface 254 can be measured and the user's position tracked. The output of these sensors may be forwarded to local controller 208 for selecting the information streams to be included in video stream 808 sent to local projector 210 for projection onto local surface 204.

In yet another embodiment, one or more cameras placed in front of and facing remote surface 254 may be used to track the position of user 262 with respect to remote surface 254. Each camera may be configured to takes images of surface 254 including images of objects positioned between surface 254 and the camera. The position of such objects (e.g., user 262) may then be determined from the images. In one embodiment, a depth camera may be used (e.g., depth cameras from PrimeSense Ltd.). In yet another embodiment, a device such as the Microsoft Kinect device may be used to sense the physical position of a user with respect to a drawing surface. In one embodiment, stereo cameras, such as those from Point Grey Research like the Bumblebee 2, may be used to capture a user's location from 2 points of view in order to identify the user's position in 3 dimensions. Various other sensors may be used in alternative embodiments to determine a user's position with respect to a drawing surface. One of ordinary skill in the art would recognize other variations, modifications, and alternatives.

In another embodiment, sound localization techniques may be used to determine the position of a user with respect to a drawing surface. For example, microphones positioned along the drawing surface (e.g., microphones 108 depicted in FIG. 1) may be used to capture audio information spoken by a user and the captured audio information may then be processed using sound localization techniques to determine a position of the user with respect to the drawing surface.

As described above, the position of a user with respect to a drawing surface may be used as a condition to select and dynamically change the information streams that are included in the video signal configured by the controller and sent to the projector for projection onto a drawing surface. In alternative embodiments, one or more conditions may be preconfigured and whether or not the conditions are met or not met determines the inclusion of information streams in the video signal sent to the projector for projection onto a surface.

Various different conditions may be configured for a collaborative system. For example, in one embodiment, the composition of the video signal generated by a controller may be based upon the level of activity at a drawing surface of the collaborative system. In one embodiment, this may be based upon whether or not a user is using the drawing surface. Different techniques may be used to detect whether a user is using a drawing surface. In one embodiment, pressure sensors may be placed on the drawing surface to detect when drawing or writing activity is in progress. A first set of one or more information streams may be included in the generated video signal if writing or drawing on the surface is detected and a second set of one or more information streams may be included when no writing/drawing activity is detected. The readings from the sensors may be forwarded to the controller thereby enabling a selector of the controller to use the information to determine the information to be included in the video signal generated and communicated to the projector. For example, in one embodiment, a condition C and the information to be displayed when condition C is met or not met may be configured as follows:

C=Writing/drawing activity occurring on remote surface 254?

If C is met, then include only the digital representations corresponding to drawings captured at local collaborative system 202 and remote collaborative system 252 in video stream 808.

If C is not met, then include only the video streams captured at local collaborative system 202 and remote collaborative system 252 in video stream 808.

In such an embodiment, video stream 808 configured by selector 802 and the information included in that video stream (and eventually projected onto local surface 204) depends upon the drawing activity on remote surface 254. Depending upon the drawing activity, the information projected on local surface 204 may be automatically and dynamically switched between the views FIGS. 7 (when condition C is met) and 6 (when condition C is not met).

Figure 9:
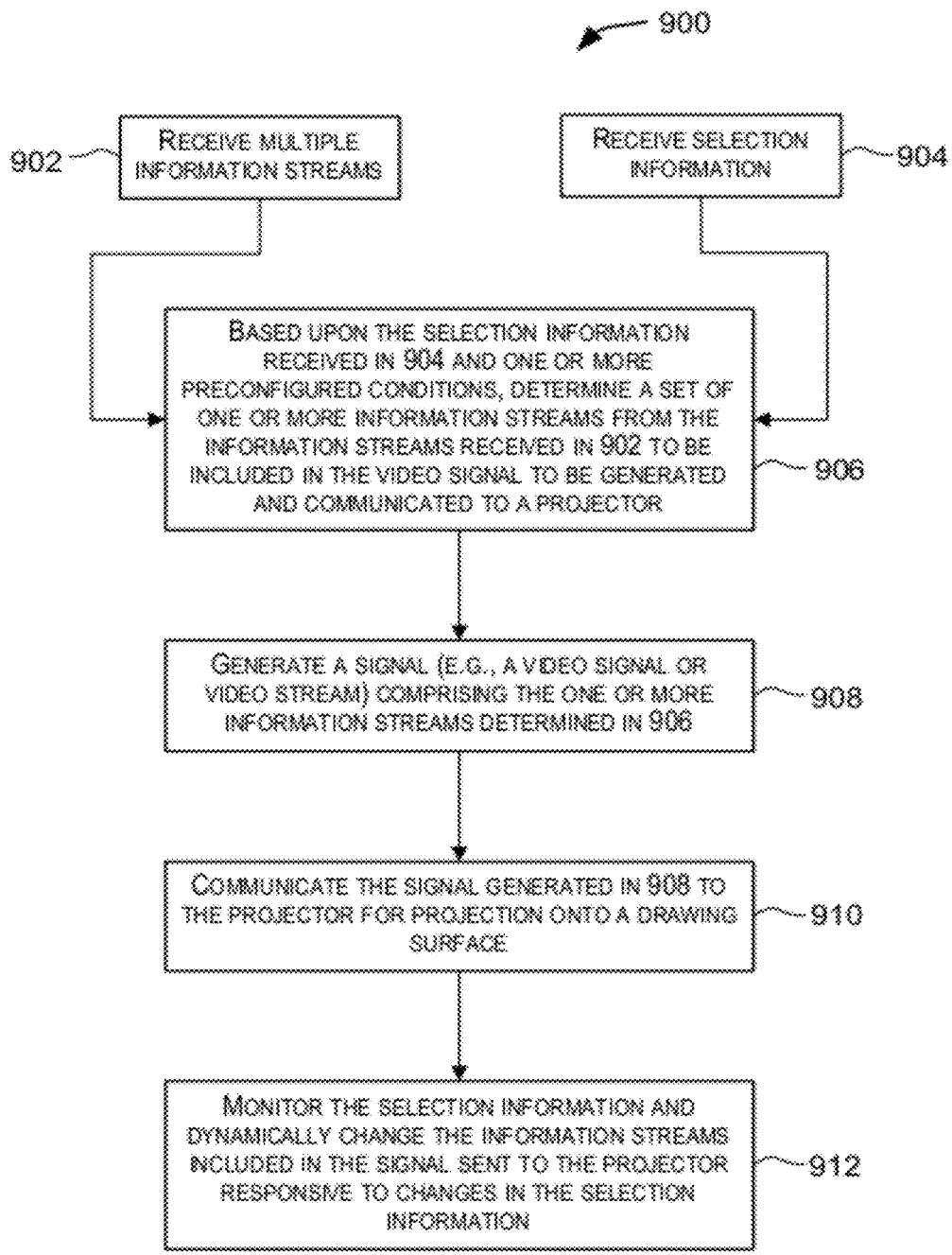
FIG. 9 depicts a simplified flowchart depicting processing performed by a collaborative system participating in a collaborative session according to an embodiment of the present invention.

FIG. 9 depicts a simplified flowchart 900 depicting processing performed by a collaborative system participating in a collaborative session according to an embodiment of the present invention. The processing depicted in FIG. 9 may be performed by one or more components of the collaborative system, such as by a controller of the collaborative system. The processing may be performed using software (e.g., code, instructions, program) executed by a processor of the controller, hardware of the controller, or combinations thereof. In one embodiment, the software executed by a controller may be stored on a non-transitory computer-readable storage medium. The steps depicted in FIG. 9 or the particular series of processing steps depicted in FIG. 9 are not intended to limit the scope of embodiments of the present invention. Other or different processing steps may be performed in alternative embodiments. One or more of steps depicted in FIG. 9 may be performed in parallel or may be performed in a serial manner.

For purposes of explaining flowchart 900 depicted in FIG. 9, it is assumed that the processing is performed by local collaborative system 202 depicted in FIG. 2, which is involved in a collaborative session with remote collaborative system 252. The processing may be performed by local controller 208 of local collaborative system 202.

A selector of controller 208 of local collaborative system 202 may receive multiple information streams (step 902) and selection information (step 904). The information streams may include, for example, a stream comprising digital representations of drawings captured locally at local collaborative system 202, a stream comprising digital representations of drawings captured at remote collaborative system 252, a video stream captured at local collaborative system 202, and a video stream captured at remote collaborative system 252. Other streams may be received in alternative embodiments.

Local controller 208 then determines, based upon the selection information received in 904, one or more information streams, from the information streams received in 902, to be included in a video signal to be generated and sent to local projector 210 for projection onto local surface 204 (step 906). In one embodiment, the processing in 906 may involve using the selection information to determine whether one or more conditions configured for the system are met (or not met), and then choosing the information streams to be included based upon the determination.

Local controller 208 then generates a signal (e.g., a video signal or video stream) that includes the one or more information streams determined in 906 (step 908). The signal generated in 908 is then communicated to local projector 210 for projection onto local surface 204 (step 910). In this manner, the information contained in the information streams included in signal 808 sent to projector 210 is output on local surface 204 such that it is viewable by users of local collaborative system 202. By performing the processing in 906 and 908, local controller 208 controls the information that is included in signal 808 sent to local projector 210 and displayed on local surface 204.

The selection information may change with passage of time. Local controller 208 is configured to monitor the selection information and dynamically make changes to the information included in signal 808 sent to local projector 210 in response to changes in the selection information (step 912). In this manner, changes in the selection information may trigger a change to be automatically and dynamically made to the information included in the signal sent to the projector, which changes the information projected onto local surface 204.

For example, as previously described, in one embodiment, the selection of information streams to be included in the video stream generated by local controller 208 may be based upon the position of remote user 262 with respect to remote surface 254. In such an embodiment, the signal generated in 908 and communicated to local projector 210 may include only the digital representations corresponding to drawings captured at local collaborative system 202 and remote collaborative system 252 when remote user 262 is within a distance D of remote surface 254, else only the video streams captured at local collaborative system 202 and remote collaborative system 252 may be included in the generated video stream. As the position of remote user 262 changes with respect to remote surface 254, this change is reflected in the selection information received by local controller 208. As a change in the remote user's position is detected, local controller 208 may automatically and dynamically switch between a first view (e.g., depicted in FIG. 7) in which only the digital representations corresponding to drawings captured at local collaborative system 202 and remote collaborative system 252 are displayed and a second view (e.g., depicted in FIG. 6) in which only the video streams captured at local collaborative system 202 and remote collaborative system 252 are displayed. In this manner, the switching of views is done automatically in response to changing conditions without requiring any manual intervention.

In the description above, certain conditions have been described that may trigger changes to the information displayed on a surface of a collaborative system. These conditions are not intended to be restrictive. Various other conditions may be configured in alternative embodiments. These conditions are user-configurable. For example, in one embodiment, the view to be shown on surfaces of both the local and remote collaborative system may be based upon a combination of information. For instance, if either user is close to the respective drawing surfaces, digital representations of drawings captured at the local and remote sites may be displayed to both users. If both users are away from their respective drawing surfaces, video streams may be shown to both users, and the like.

Figure 10:
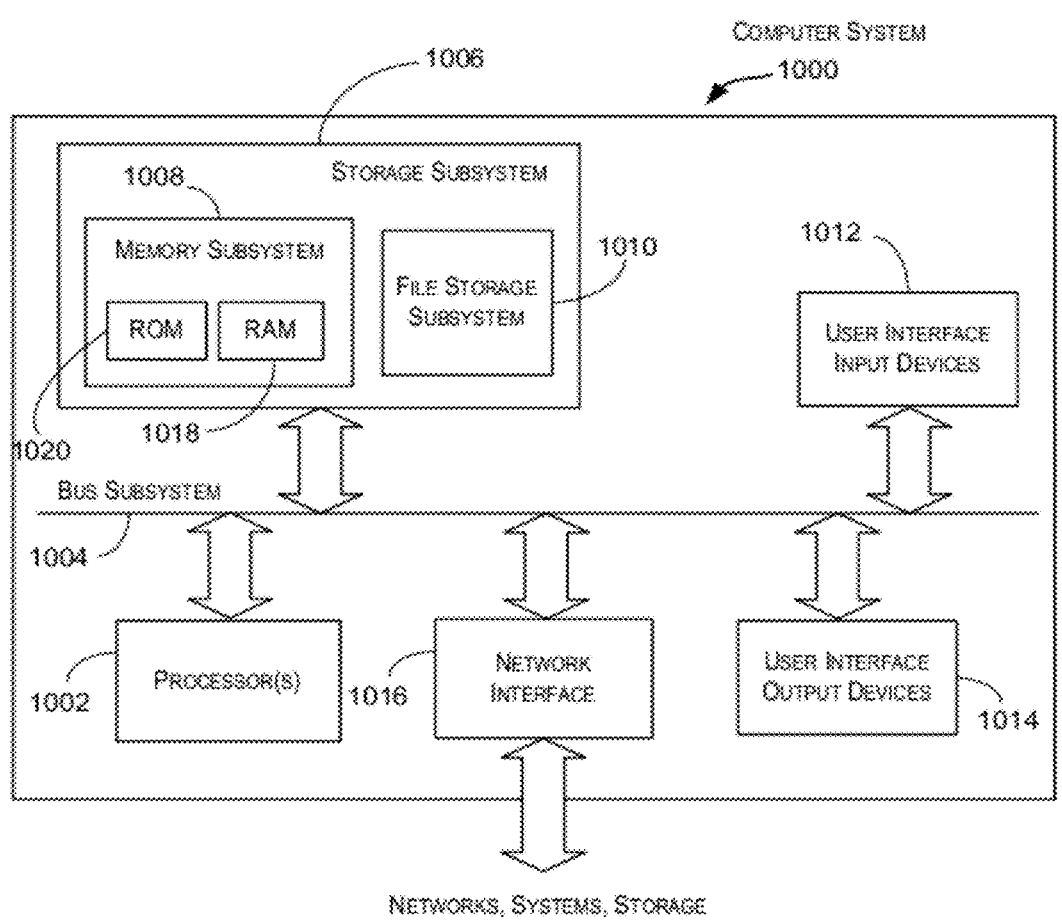
FIG. 10 is a simplified block diagram of a computer system in accordance with an embodiment of the present invention.

FIG. 10 is a simplified block diagram of a computer system 1000 according to an embodiment of the present invention. In one set of embodiments, computer system 1000 can be used to implement controller 110 illustrated in FIG. 1 and controllers 208 and 258 depicted in FIG. 2 described above. As shown in FIG. 10, computer system 1000 can include one or more processors 1002 that communicate with a number of peripheral subsystems via a bus subsystem 1004. These peripheral subsystems can include a storage subsystem 1006, comprising a memory subsystem 1008 and a file storage subsystem 1010, user interface input devices 1012, user interface output devices 1014, and a network interface subsystem 1016.

Bus subsystem 1004 can provide a mechanism for enabling the various components and subsystems of computer system 1000 to communicate with each other as intended. Although bus subsystem 1004 is shown schematically as a single bus, alternative embodiments of the bus subsystem can utilize multiple busses.

Network interface subsystem 1016 can serve as an interface for receiving data from and transmitting data to other systems and/or networks. For example, network interface subsystem 1016 can enable the controller of one collaborative system (e.g., local collaborative system 202 of FIG. 2) to communicate with the controller of another remotely located collaborative system (e.g., remote collaborative system 252 of FIG. 2) via a communication network such as the Internet.

User interface input devices 1012 can include a drawing surface (e.g., surface 102 of FIG. 1), keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 1000.

User interface output devices 1014 can include a display subsystem, a printer, a fax machine, or non-visual displays such as audio output devices, etc. The display subsystem can be a cathode ray tube (CRT), a flat-panel device such as a liquid crystal display (LCD), or a projection device (e.g., projector 112 of FIG. 1). In general, use of the term "output device" is intended to include all possible types of devices and mechanisms for outputting information from computer system 1000.

Storage subsystem 1006 can provide a computer-readable storage medium (including non-transitory storage) for storing the basic programming and data constructs that provide the functionality of the present invention. Software (e.g., programs, code modules, instructions, etc.) that when executed by a processor provide the functionality of the present invention can be stored in storage subsystem 1006. These software modules or instructions can be executed by processor(s) 1002. Storage subsystem 1006 can also provide a repository for storing data used in accordance with the present invention. Storage subsystem 1006 can comprise memory subsystem 1008 and file/disk storage subsystem 1010.

Memory subsystem 1008 can include a number of memories including a main random access memory (RAM) 1018 for storage of instructions and data during program execution and a read only memory (ROM) 1020 in which fixed instructions are stored. File storage subsystem 1010 can provide a non-transitory persistent (non-volatile) storage for program and data files, and can include a hard disk drive, a floppy disk drive along with associated removable media, a Compact Disk Read Only Memory (CD-ROM) drive, an optical drive, removable media cartridges, and/or other like storage media.

Computer system 1000 can be of various types including a personal computer, a phone, a portable computer, a workstation, a network computer, or any other data processing system. Due to the ever-changing nature of computers and networks, the description of computer system 1000 depicted in FIG. 10 is intended only as a specific example for purposes of illustrating one embodiment of a computer system. Many other configurations having more or fewer components than the system depicted in FIG. 10 are possible.

Although specific embodiments of the invention have been described, various modifications, alterations, alternative constructions, and equivalents are also encompassed within the scope of the invention. For example, embodiments of the present invention are not restricted to operation within certain specific data processing environments, but are free to operate within a plurality of data processing environments. Further, although embodiments of the present invention have been described using a particular series of transactions and steps, these are not intended to limit the scope of inventive embodiments.

Yet further, while embodiments of the present invention have been described using a particular combination of hardware and software, it should be recognized that other combinations of hardware and software are also within the scope of the present invention. For example, embodiments of the present invention may be implemented only in hardware, or only in software, or using combinations thereof The specification and drawings are, accordingly, to be regarded in an illustrative rather than a restrictive sense. It will be evident that additions, subtractions, deletions, and other modifications and changes may be made thereunto without departing from the broader spirit and scope of the invention.

What is claimed is:

1. A method comprising:
generating, by a first system, a first signal including a first information stream comprising an electronic representation of written information on a first surface, wherein the first surface is configured to accept written information and display a video image;
generating, by the first system, a second signal including a first video stream;
receiving, by the first system, a third signal including a second information stream comprising an electronic representation of written information on a second surface, wherein the second surface is part of a second system located remotely from the first system;
receiving, by the first system, a fourth signal including a second video stream;
determining, by the first system if a condition is met;
if the condition is met, selecting, by the first system, the first signal and the third signal for display on the first surface; and
if the condition is not met, selecting, by the first system, the second signal and the fourth signal for display on the first surface.

2. The method of claim 1, wherein determining that the condition is met includes determining that a first user is within a predetermined distance from the first surface.

3. The method of claim 2 wherein determining that the first user is within the predetermined distance from the first surface includes:
receiving input from one or more pressure sensors disposed in an area on the ground in front of the first surface;

determining a distance of the first user from the first surface based on the input from the one or more pressure sensors; and determining that the distance is equal to or less than the predetermined distance.

4. The method of claim 2 wherein determining that the first user is within the predetermined distance from the first surface includes:

receiving input from a camera coupled to the first surface and oriented outward from the first surface;

determining a distance of the first user from the first surface based on the input from the camera, wherein the first user is located in front of the first surface; and determining that the distance is equal to or less than the predetermined distance.

5. The method of claim 1, wherein determing that the condition is met includes determining that a second user is within a predetremined distance from the second surface.

6. The method of claim 1, wherein the first video stream is captured by a camera coupled to the first surface.

7. The method of claim 1, wherein selecting the first signal and the third signal for display comprises generating a first video signal including the first signal and the third signal and causing the first video signal to be displayed on the first surface.

8. The method of claim 1, wherein selecting the second signal and the fourth signal for display comprises generating a second video signal including the second signal and the fourth signal and causing the second video signal to be displayed on the first surface.

9. The method of claim 1, wherein determining whether the condition is met includes: receiving input from one or more pressure sensors embedded in the first surface, the input indicating that a user is using the first surface; and determining that the condition is met based on the input.

10. The method of claim 1, wherein the first video stream comprises at least a first user using the first surface; and the second video stream comprises at least a second user using the second surface.

11. A non-transitory computer-readable storage medium storing a plurality of instructions for execution by a first system, the plurality of instructions comprising:

instructions that cause the first system to generate a first signal including a first information stream comprising an electronic represenation of written information on a first surface, wherein the first surface is configured to accept written information and display a video image;

instructions that cause the first system to generate a second signal including a first video stream;

instructions that cause the first system to receive a third signal including a second information stream comprising an electronic representation of written information on a second surface, wherein the second surface is part of a second system located remotely from the first system;

instructions that cause the first system to receive a fourth signal including a second video stream;

instructions that cause the first system to determine if a condition is met;

instructions that cause the first system to select the first signal and the third signal for display on the first surface if the condition is met; and instructions that cause the first system to select the second signal and the fourth signal for display on the first surface if the condition is not met.

12. The non-transitory computer-readable storage medium of claim 11, wherein the plurality of instructions further comprises instructions that cause the first system to determine that a first user is within a predetermined distance from the first surface and instructions that cause the first system to conclude that the condition is met based on the determination.

13. The non-transitory computer-readable storage medium of claim 12, wherein predetemined distance is measured using a proximity sensor, a camera, a depth sensor, or a pressure sensor, each coupled to the first system.

14. The non-transitory computer-readable storage medium of claim 12, wherein the plurality of instructions further comprises:

instructions that cause the first system to generate a first video signal including the first signal and the third signal, if the condition is met;

instructions that cause the first system to cause the first video signal to be displayed on the first surface, if the condition is met;

instructions that cause the first system to generate a second video signal including the second signal and the fourth signal, if the condition is not met; and instructions that cause the first system to cause the second video signal to be displayed on the first surface, if the condition is not met.

15. The non-transitory computer-readable storage medium of claim 11, wherein the plurality of instructions further comprises instructions that cause the first system to determine if a second user is within a predetermiend distance from the second surface and instructions that cause the first system to conclude that the condition is met based on the determination.

16. The non-transitory computer-readable storage medium of claim 11, wherein the first video stream comprises at least a first user using the first surface; and the second video stream comprises at least a second user using the second surface.

17. A system comprising:

a memory; and a processor coupled to the memory, wherein the processor is configured to:

generate a first signal including a first information stream comprising an electronic represenation of written information on a first surface, wherein the first surface is configured to accept written information and display a video image;

generate a second signal including a first video stream;

receive a third signal including a second information stream comprising an electronic representation of written information on a second surface, wherein the second surface is part of a second system located remotely from the system;

receive a fourth signal including a second video stream;

determine if a condition is met;

select the first signal and the third signal for display on the first surface if the condition is met; or select the second signal and the fourth signal for display on the first surface if the condition is not met.

18. The system of claim 17, wherein to determine that the condition is met, the processor is configured to determine that a first user is within a predetermined distance from the first surface.

19. The system of claim 18, wherein the predetermined distance is measured using one of: a proximity sensor, a depth sensor, a camera, or a pressure sensor, each coupled to the system.

20. The system of claim 17 wherein to determine that the condition is met, the processor is configured to determine that a second user is within a predetermined distance from the second surface.

21. The system of claim 17 wherein the processor is further configured to:
   generate a first video signal including the first signal and the third signal, if the condition is met;
   cause the first video signal to be displayed on the first surface, if the condition is met;
   generate a second video signal including the second signal and the fourth signal, if the condition is not met; and
   cause the second video signal to be displayed on the first surface, if the condition is not met.

22. The system of claim 21, further comprising a projector, wherein the projector is configured to receive the first video signal and project contents of the first video signal onto the first surface.

23. The system of claim 17, wherein the written information on the first surface is generated using a dry erase marker.

24. The system of claim 17, wherein the first video stream comprises at least a first user using the first surface and the second video stream comprises at least a second user using the second surface.

* * * * *